(12) United States Patent
Nishida

(10) Patent No.: US 12,043,292 B2
(45) Date of Patent: Jul. 23, 2024

(54) INFORMATION PROCESSING DEVICE, INFORMATION PROCESSING METHOD, AND NON-TRANSITORY STORAGE MEDIUM

(71) Applicant: Toyota Jidosha Kabushiki Kaisha, Toyota (JP)

(72) Inventor: Junichi Nishida, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 423 days.

(21) Appl. No.: 17/405,075

(22) Filed: Aug. 18, 2021

(65) Prior Publication Data
US 2022/0055666 A1  Feb. 24, 2022

(30) Foreign Application Priority Data
Aug. 20, 2020 (JP) ................................. 2020-139058

(51) Int. Cl.
*B60W 60/00* (2020.01)
*B60W 30/095* (2012.01)
(Continued)

(52) U.S. Cl.
CPC .... *B60W 60/0059* (2020.02); *B60W 30/0953* (2013.01); *B60W 30/0956* (2013.01);
(Continued)

(58) Field of Classification Search
CPC ......... B60W 60/0059; B60W 30/0953; B60W 30/0956; B60W 50/14; B60W 60/0051; B60W 60/0053; B60W 2420/54; B60W 2050/143; B60W 2554/4041; B60W 2554/805; B60W 60/0016; B60W 30/095;
(Continued)

(56) References Cited

U.S. PATENT DOCUMENTS

2006/0261979 A1* 11/2006 Draaijer .................. G08G 1/04
340/937
2010/0142715 A1* 6/2010 Goldstein ............... G10L 25/51
707/769
(Continued)

FOREIGN PATENT DOCUMENTS

CN    110602582 A    12/2019
CN    111491236 A    8/2020
(Continued)

*Primary Examiner* — Anshul Sood
*Assistant Examiner* — Micah Chuen-Him Cheng
(74) *Attorney, Agent, or Firm* — Dinsmore & Shohl LLP

(57) ABSTRACT

The present disclosure provides a technology that can preferably improve the usability when a user wearing a hearable device boards a vehicle. In an information processing device according to the present disclosure, a controller obtains a drive mode of a vehicle in which a user wearing the hearable device rides. When the drive mode of the vehicle is an automatic drive mode, the controller permits the operation mode of the hearable device to be set to a first mode. On the other hand, when the drive mode of the vehicle is a manual drive mode and a user wearing a hearable device is a user performing a drive operation of the vehicle, the controller sets the operation mode of the hearable device to a second mode.

20 Claims, 5 Drawing Sheets

(51) Int. Cl.
*B60W 50/14* (2020.01)
*G05B 15/02* (2006.01)
(52) U.S. Cl.
CPC ........ *B60W 50/14* (2013.01); *B60W 60/0051* (2020.02); *B60W 60/0053* (2020.02); *G05B 15/02* (2013.01); *B60W 2420/54* (2013.01)
(58) Field of Classification Search
CPC ..... B60W 40/08; G05B 15/02; H04R 1/1041; H04R 2460/01; H04R 2499/13; H04R 1/1083; H04R 3/00; B60R 16/023; G10K 11/178

See application file for complete search history.

(56) References Cited

U.S. PATENT DOCUMENTS

| | | | |
|---|---|---|---|
| 2010/0245582 A1* | 9/2010 | Harel | G08B 13/19621 348/143 |
| 2011/0273568 A1* | 11/2011 | Lagassey | H04W 40/02 348/E7.085 |
| 2017/0093195 A1* | 3/2017 | Lee | G08C 17/02 |
| 2017/0171730 A1* | 6/2017 | Tzirkel-Hancock | H04W 4/023 |
| 2017/0200443 A1 | 7/2017 | Kurosawa | |
| 2018/0310159 A1* | 10/2018 | Katz | H04W 4/50 |
| 2019/0335035 A1* | 10/2019 | Borras | H04M 1/72421 |
| 2019/0364353 A1 | 11/2019 | Okada et al. | |
| 2020/0020328 A1* | 1/2020 | Gordon | G10L 15/08 |
| 2020/0168200 A1 | 5/2020 | Pognon et al. | |
| 2020/0236521 A1* | 7/2020 | Vassilovski | G08B 29/188 |
| 2020/0267503 A1* | 8/2020 | Watkins | H04W 4/027 |
| 2021/0099787 A1 | 4/2021 | Yang et al. | |
| 2021/0329430 A1* | 10/2021 | Stafford | G01S 11/14 |
| 2021/0345043 A1* | 11/2021 | Trestain | H04R 3/02 |

FOREIGN PATENT DOCUMENTS

| | | |
|---|---|---|
| JP | 2017-124686 A | 7/2017 |
| JP | 2019-205124 A | 11/2019 |
| JP | 2019-206211 A | 12/2019 |

* cited by examiner

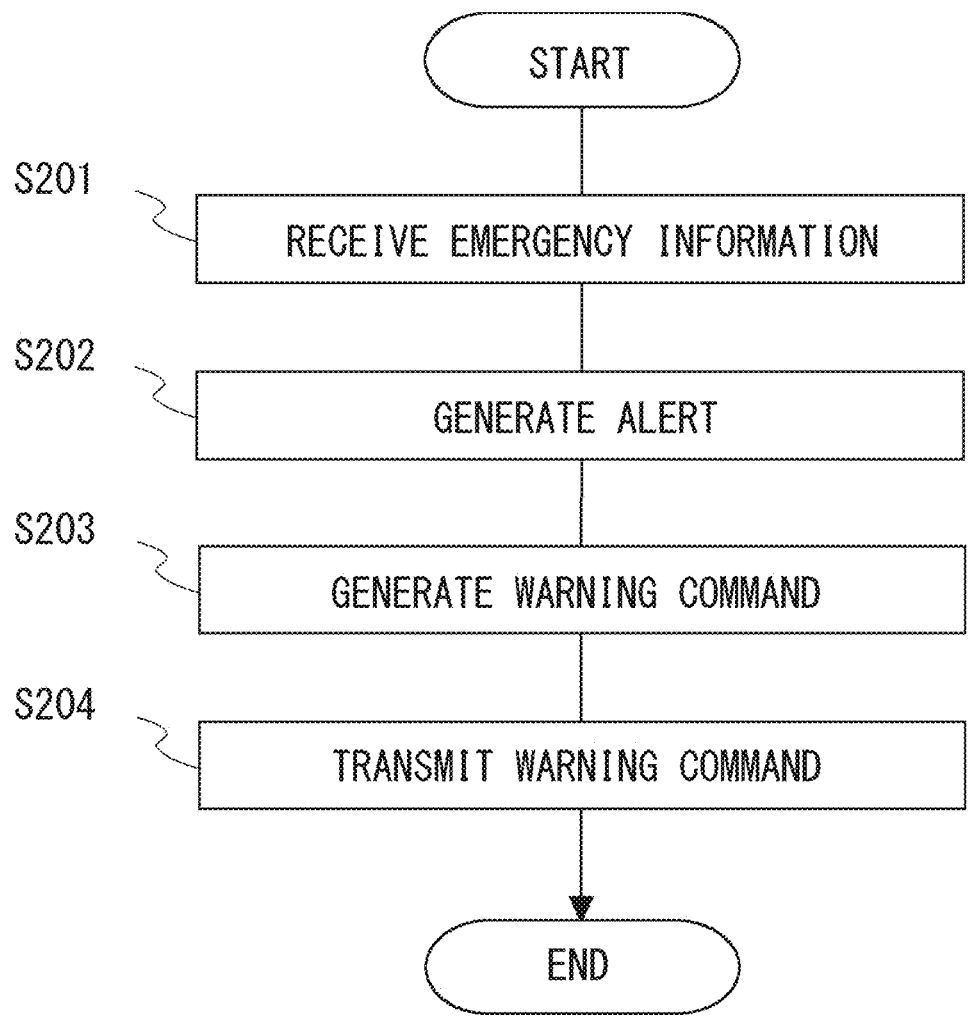
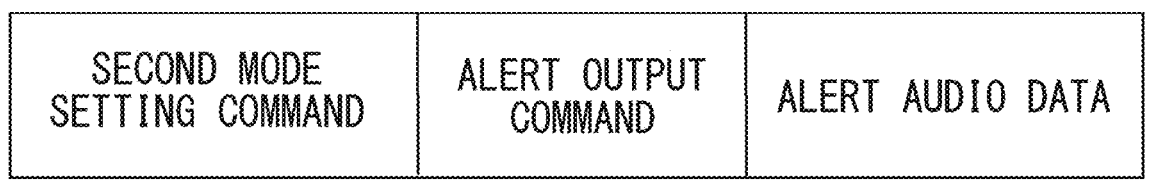

INFORMATION PROCESSING DEVICE, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-139058, filed on Aug. 20, 2020, which is hereby incorporated by reference herein in its entirety.

BACKGROUND

Technical Field

This disclosure relates to an information processing device, an information processing method, and a non-transitory storage medium.

Description of the Related Art

A hearable device has been known that can switch a mode of making external sounds difficult to hear (noise cancelling mode), and a mode of making external sounds easy to hear (ambient mode). A technology has been proposed that sets the operation mode of such a hearable device to the ambient mode when a user wearing the hearable device sits in a driver's seat of a vehicle or performs a vehicle activation operation (for example, see Japanese Patent Laid-Open No. 2019-206211).

[Patent document 1] Japanese Patent Laid-Open No. 2019-206211

SUMMARY

One or more aspects of the present disclosure are directed to provide a technology that can improve as much as possible the usability when a user wearing a hearable device boards a vehicle.

The present disclosure can be grasped as an information processing device for controlling a hearable device switchable between a first mode that is an operation mode of making an external sound difficult to hear, and a second mode that is an operation mode of making the external sound easy to hear.

The information processing device in this case may include, for example, a controller including at least one processor that executes:
 obtaining a drive mode of a vehicle in which a user wearing the hearable device rides;
 permitting the operation mode of the hearable device to be set to the first mode, when the drive mode of the vehicle is an automatic drive mode; and
 setting the operation mode of the hearable device to the second mode when the user is a user performing a drive operation of the vehicle and the drive mode of the vehicle is a manual drive mode.

Alternatively, the present disclosure can be grasped as an information processing method for controlling a hearable device switchable between a first mode that is an operation mode of making an external sound difficult to hear, and a second mode that is an operation mode of making the external sound easy to hear.

The information processing method in this case may comprise, for example:
 obtaining a drive mode of a vehicle in which a user wearing the hearable device rides;
 permitting the operation mode of the hearable device to be set to the first mode, when the drive mode of the vehicle is an automatic drive mode; and
 setting the operation mode of the hearable device to the second mode when the user is a user performing a drive operation of the vehicle and the drive mode of the vehicle is a manual drive mode.

Here, the present disclosure can also be gasped as a non-transitory storage medium storing an information processing program for achieving the information processing method.

The present disclosure can provide a technology that can improve as much as possible the usability when a user wearing a hearable device boards a vehicle.

BRIEF DESCRIPTION OF THE DRAWINGS

FIG. 5 is a flowchart illustrating a processing flow performed in the vehicle-mounted device in a modified example 1; and FIG. 6 is a diagram schematically illustrating an example of a warning command.

DESCRIPTION OF THE EMBODIMENTS

Figure 1:
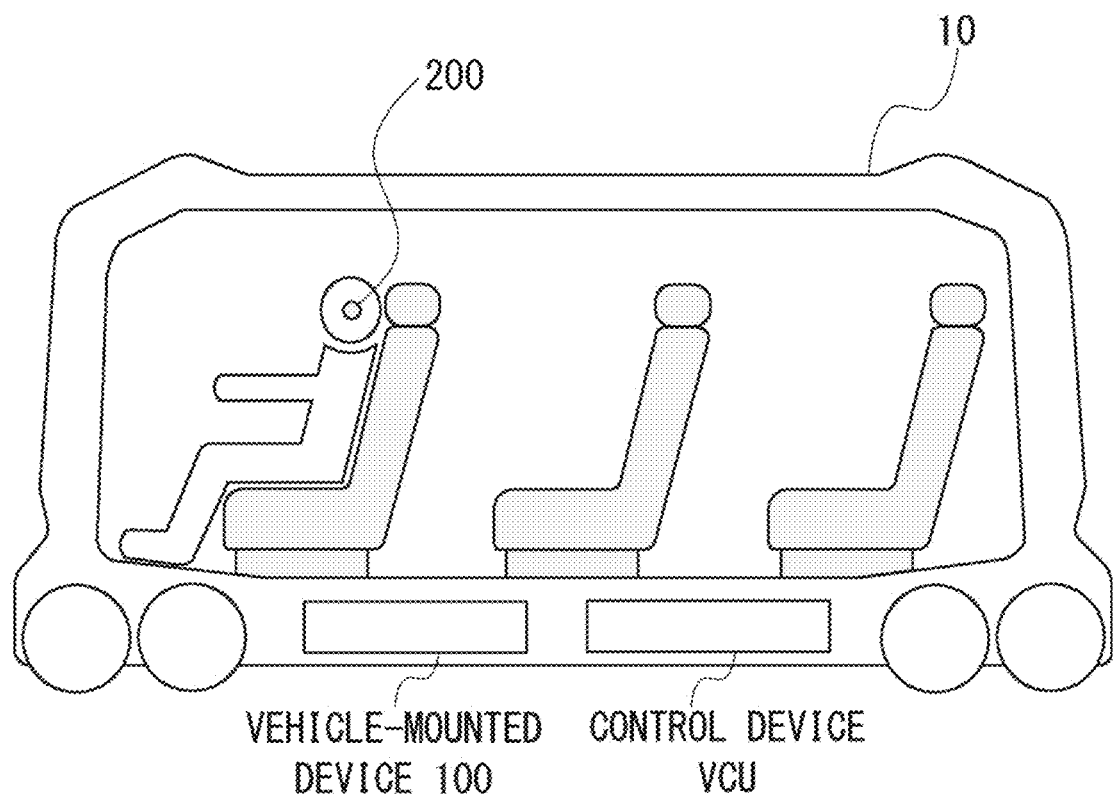
FIG. 1 is a first diagram illustrating an overview of a device control system.

The present disclosure may be applied to an information processing device for controlling a hearable device switchable between a first mode (noise cancelling mode) that makes an external sound difficult to hear, and a second mode (ambient mode) that makes the external sound easy to hear. Such an information processing device may be mounted on a vehicle, or mounted on the hearable device.

In recent years, a technology has been developed that utilizes a hearable device for information providing services, such as automatic translation (machine translation) and information search on the Internet, in addition to music appreciation, voice calls and the like. Accordingly, it is predicted that the opportunity of a user boarding a vehicle in a state of wearing a hearable device increases. In this case, in view of securing the safety of the vehicle, it is desired to permit a user to hear an external sound easily.

On the other hand, a method is conceivable that estimates that a user performs a drive operation of a vehicle, and automatically sets the operation mode of a hearable device worn by the user to the second mode, when the user sits in a driver's seat of the vehicle or performs an activation operation of the vehicle. Incidentally, the user who is seated in the driver's seat of the vehicle or has performed the vehicle activation operation does not necessarily perform the drive operation of the vehicle. For example, under a condition where the vehicle drives in an automatic drive mode, even the user seated in the driver's seat or the user having performed the vehicle activation operation does not perform the drive operation of the vehicle. In such a case, when the hearable device worn by the user is automatically set to the second mode, there is a possibility that the usability of the user is degraded.

On the contrary, in an information processing device according to the present disclosure, a controller may obtain a drive mode of a vehicle in which a user wearing the hearable device rides. The "drive mode" described here includes at least two drive modes that are an automatic drive mode in which the vehicle autonomously travels, and a manual drive mode in which the vehicle travels according to a manual operation of the user. The manual drive mode is a drive mode in which a part of or the entire drive operation required for driving the vehicle is performed by the manual operation of the user. That is, the drive mode in which at least a part of the drive operation required for driving the vehicle is performed by the manual operation of the user and the remaining drive operation is automatically performed by the vehicle is assumed to be also included in "manual drive mode" described here.

Here, when the obtained drive mode of the vehicle is the automatic drive mode, the controller permits the operation mode of the hearable device to be set to the first mode. The target to be "permit(ed)" described here encompasses a mode in which the operation mode of the hearable device is automatically set to the first mode, and a mode in which the operation mode of the hearable device is set to the first mode by the manual operation of the user. Accordingly, when the drive mode of the vehicle is the automatic drive mode even with the user who wears the hearable device being seated in the driver's seat, the user can use the hearable device in the first mode. On the other hand, the controller may set the operation mode of the hearable device to the second mode when the user is a user performing the drive operation of the vehicle and the drive mode of the vehicle is the manual drive mode. Accordingly, when the drive mode of the vehicle is the manual drive mode even with the user who wears the hearable device being the user performing the drive operation of the vehicle, the user may be prevented from using the hearable device in the first mode. Consequently, according to the present disclosure, in conformity with the drive mode of the vehicle, use of the first mode in the hearable device can be permitted or prevented. As a result, the usability when the user wearing the hearable device boards the vehicle can be improved as much as possible.

Here, when the drive mode of the vehicle is the manual drive mode and the user wearing the hearable device is a user not performing the drive operation of the vehicle, the controller may permit the operation mode of the hearable device to be set to the first mode. Accordingly, even when the drive mode of the vehicle is the manual drive mode, the user not performing the drive operation of the vehicle can use the hearable device in the first mode.

When a predetermined emergency situation is detected, the controller may set the operation mode of the hearable device to the second mode. Accordingly, even with the user in the vehicle traveling in the automatic drive mode, upon detection of the predetermined emergency situation, the operation mode of the hearable device worn by the user is automatically set to the second mode. Furthermore, even with the user in the vehicle traveling in the manual drive mode and not performing the drive operation of the vehicle, upon detection of the predetermined emergency situation, the operation mode of the hearable device worn by the user may be automatically set to the second mode. Accordingly, when the predetermined emergency situation is detected, the user in the vehicle in a state of wearing the hearable device can securely hear an external sound and the like. As a result, the user wearing the hearable device can easily and quickly grasp the predetermined emergency situation. Note that "predetermined emergency situation" described here is a situation that requires the user in the vehicle to pay attention, and is, for example, the following situations.

(Situation 1) A situation where another mobile body approaches the vehicle concerned (Situation 2) A situation where the vehicle concerned collides with a target object (Situation 3) A situation where the vehicle concerned causes an abnormal behavior (skidding, weaving or the like)

(Situation 4) A situation where a notification device mounted on the vehicle concerned issues an emergency notification (Situation 5) A situation where an abnormality occurs in the user performing the drive operation of the vehicle concerned The predetermined emergency situation in the present disclosure is not limited to any of the situations described above, and may be a situation where a disaster occurs, or a situation where a possibility of causing a disaster or the like occurs.

When the predetermined emergency situation as described above is detected, the controller may cause the hearable device to emit a sound of an alert. Accordingly, the user wearing the hearable device is allowed to securely recognize occurrence of the predetermined emergency situation. Even in case a device, such as a speaker mounted on the vehicle, malfunctions owing to occurrence of the predetermined emergency situation, the user can be notified of the alert.

Here, the hearable device in the present disclosure may include a pair of sound emission units configured to emit sounds to respective ears of the user. A situation where the other mobile body approaches a right side of the vehicle is detected, the controller may cause the sound emission unit positioned on the right side in the lateral direction of the vehicle, between the pair of sound emission units, to emit the sound of the alert. A situation where the other mobile body approaches a left side of the vehicle is detected, the controller may cause the sound emission unit positioned on the left side in the lateral direction of the vehicle, between the pair of sound emission units, to emit the sound of the alert. Accordingly, the user wearing the hearable device can intuitively grasp the direction in which another mobile body approaches.

Here, the alert in case a situation where the notification device mounted on the vehicle issues an emergency notification is detected may include a call with the notification destination of the emergency notification. Accordingly, the user wearing the hearable device can hear the call with the notification destination of the emergency notification, or talk with an operator or the like at the notification destination.

When a user in the vehicle speaks and another user different from this user is also in the vehicle, the controller may set the operation mode of the hearable device worn by the other user to the second mode. Accordingly, the other user can easily hear the content of the speech made by the speaking user.

Embodiment

Hereinafter, a specific embodiment of the present disclosure is described with reference to the drawings. The dimensions, material, shape, relative arrangement and the like of configuration components described in this embodiment are not intended to limit the technical scope of the disclosure, unless otherwise described.

In this embodiment, an example is described where the present disclosure is applied to a system (hereinafter, sometimes described as "device control system") for controlling a hearable device of a user in a vehicle.

(Overview of Device Control System)

Figure 2:
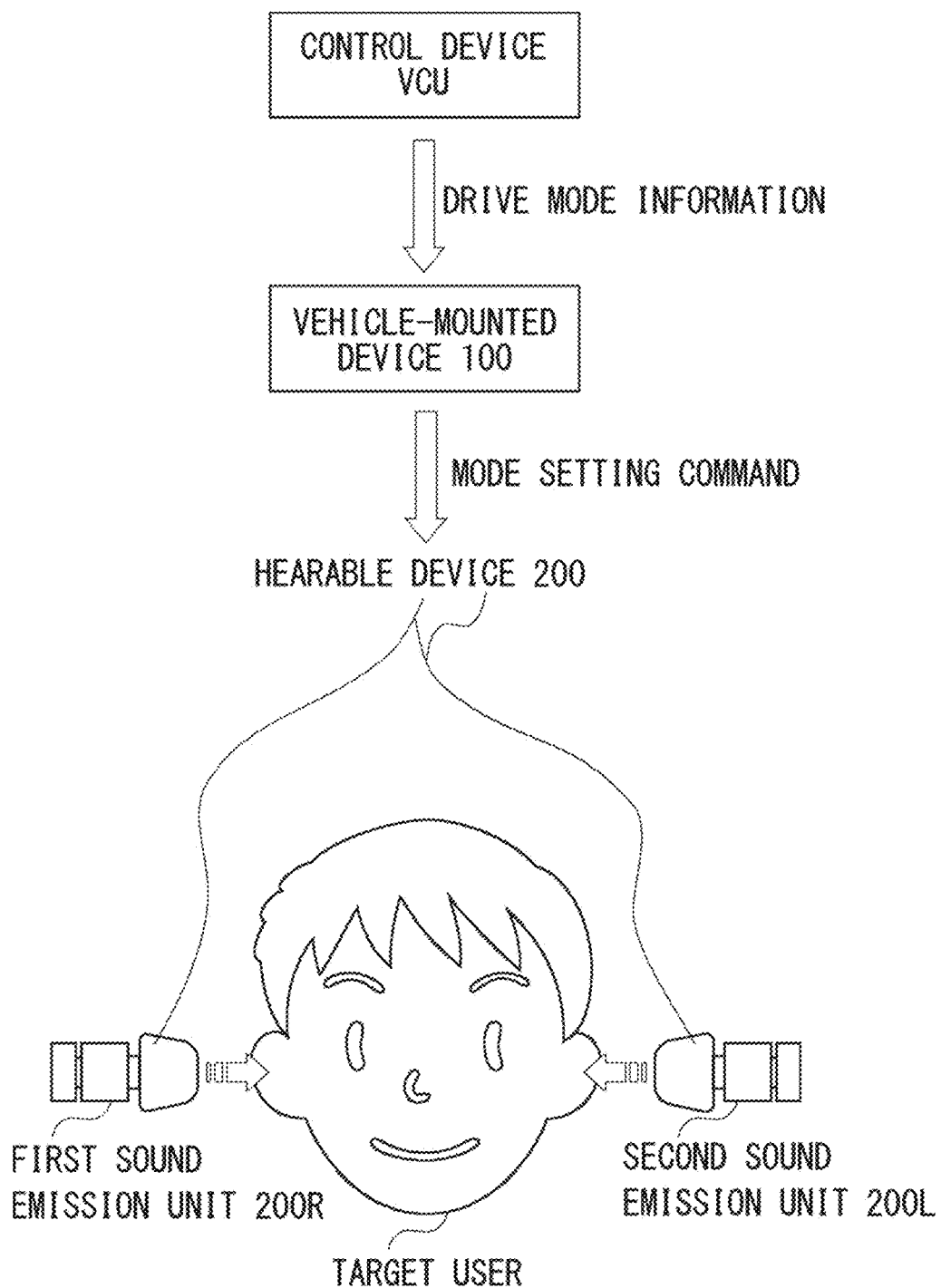
FIG. 2 is a second diagram illustrating the overview of the device control system.

FIGS. 1 and 2 are diagrams illustrating the overview of the device control system. The device control system in this embodiment includes a vehicle-mounted device 100 mounted on a vehicle 10, and a hearable device 200 worn by a user boarding the vehicle 10. The vehicle-mounted device 100 and the hearable device 200 communicate with each other using near field communication or the like, for example. Note that in the example illustrated in FIGS. 1 and 2, only one hearable device 200 is illustrated. Alternatively, in a case where multiple users board the vehicle 10 in a state of wearing hearable devices 200, the number of devices may be two or more.

The vehicle 10 is a vehicle that can switch the drive mode (automatic drive mode) for autonomous travel by automatic driving, and the drive mode (manual drive mode) for travel according to the manual operation of the user. The "manual drive mode" described here is a drive mode in which a part of or the entire drive operation required for driving the vehicle 10 is performed by the manual operation of the user. That is, the manual drive mode also includes a drive mode in which at least a part of the drive operation required for driving the vehicle is performed by the manual operation of the user and the remaining drive operation is automatically performed by the vehicle. Note that switching between the automatic drive mode and the manual drive mode may be performed freely by the user, or performed automatically by the vehicle 10. Such a vehicle 10 is mounted with a control device VCU (Vehicle Control Unit). The control device VCU controls a drive system and the like of the vehicle 10, based on detection signals of various sensors mounted on the vehicle 10 and on the drive mode and the like. The control device VCU includes a function of outputting various warnings on the basis of the detection signals of the various sensors, or of control for avoiding collision between the vehicle 10 and a target object.

The vehicle-mounted device 100 corresponds to an "information processing device" according to the present disclosure. The vehicle-mounted device 100 obtains various pieces of information from the control device VCU, and controls the hearable device 200 on the basis of the obtained information. In this example, the vehicle-mounted device 100 obtains information about the drive mode from the control device VCU, and controls the operation mode of the hearable device 200 according to the obtained drive mode. A method of controlling the operation mode of the hearable device 200 is described later.

As illustrated in FIG. 2, the hearable device 200 includes a first sound emission unit 200R worn on the right ear of the user, and a second sound emission unit 200L worn on the left ear of the user. The hearable device 200 provides the user with various types of audio content through the first sound emission unit 200R and the second sound emission unit 200L. The hearable device 200 in this example is configured to be capable of switching the operation mode to any of the first mode and the second mode. The first mode is an operation mode of making an external sound difficult to hear for the ears of the user (what is called a noise cancelling mode). The second mode is an operation mode of making an external sound easy to hear for the ears of the user (what is called an ambient mode). Switching between these operation modes may be basically performed freely by the user. Note that when the user is in the vehicle 10, switching of the operation mode is managed according to a command from the vehicle-mounted device 100.

(System Configuration)

Figure 3:
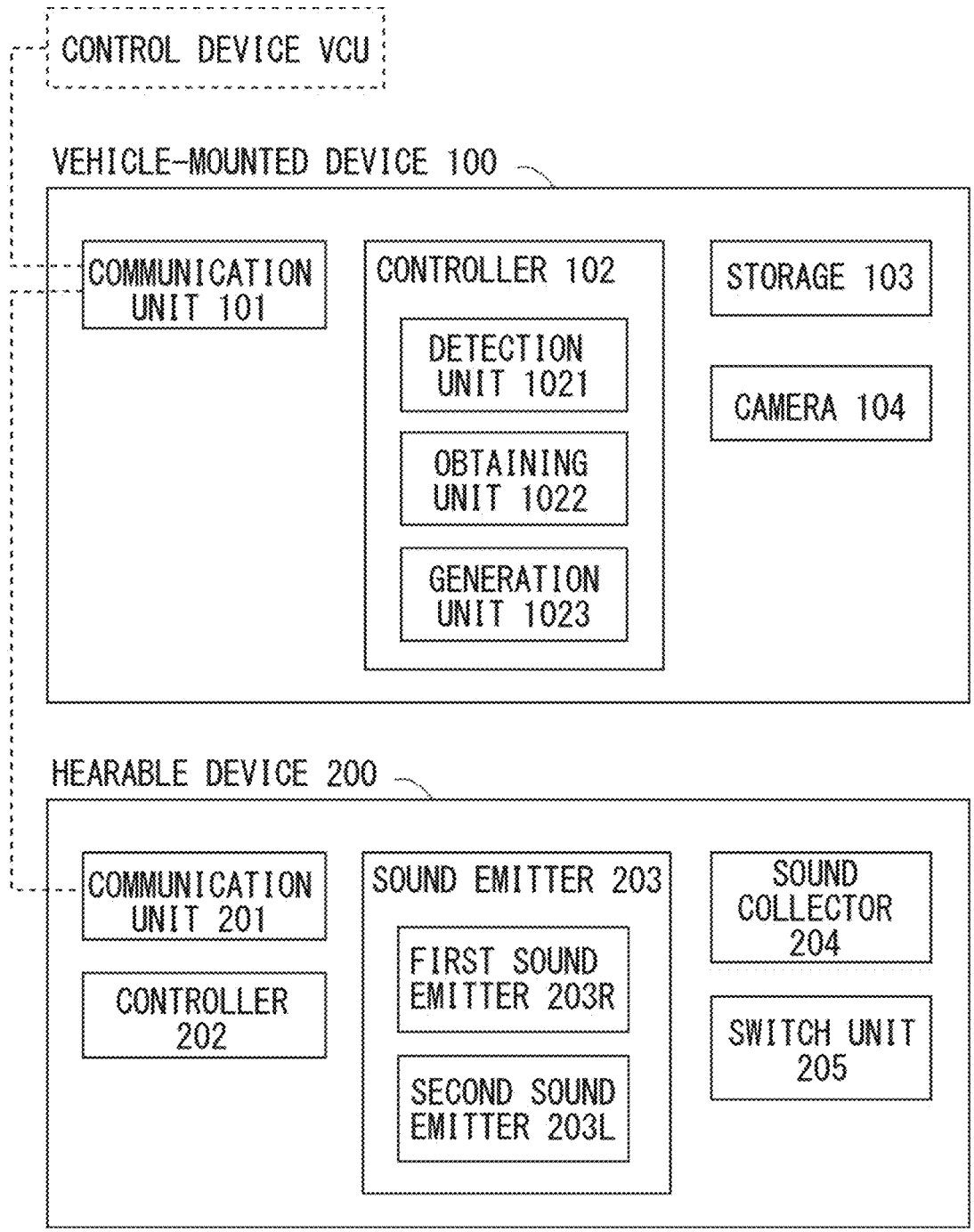
FIG. 3 is a block diagram schematically illustrating an example of configurations of a vehicle-mounted device and a hearable device that are included in the device control system.

Here, the configuration of the device control system in this embodiment is described with reference to FIG. 3. FIG. 3 is a block diagram schematically illustrating an example of configurations of the vehicle-mounted device 100 and the hearable device 200 illustrated in FIGS. 1 and 2.

(Vehicle-Mounted Device 100)

As described above, the vehicle-mounted device 100 is an information processing device that controls the operation mode of the hearable device 200 on the basis of the operation mode and the like of the vehicle 10. Such a vehicle-mounted device 100 can be made up of a small-sized computer. For example, the vehicle-mounted device 100 includes a processor (a CPU, a GPU or the like), a main memory (a RAM, a ROM or the like), an auxiliary memory (an EPROM, a hard disk drive, a removable medium or the like). Note that the removable medium may be a recording medium, such as a USB memory, a CD, or a DVD. The auxiliary memory stores an operating system (OS), various programs, various tables and the like. The processor executes the programs stored in the auxiliary memory, thereby achieving each function in conformity with a predetermined object as described later. Note that some or all of the functions of the vehicle-mounted device 100 may be achieved as a hardware circuit, such as an ASIC or an FPGA.

As illustrated in FIG. 3, the vehicle-mounted device 100 in this example includes a communication unit 101, a controller 102, a storage 103, and a camera 104. Note that the configuration of the vehicle-mounted device 100 is not limited to the example illustrated in FIG. 3. Configuration elements may be appropriately omitted, replaced, and added.

The communication unit 101 includes a device of wirelessly communicating with an external device. The communication unit 101 in this example performs near field wireless communication with the control device VCU or the bearable device 200 residing in the room of the vehicle 10, using a predetermined wireless communication standard. The near field wireless communication may be achieved according to a Bluetooth® Low Energy standard (hereinafter, BLE), for example. The near field wireless communication may be achieved using NFC (Near Field Communication), UWB (Ultra Wideband), Wi-Fi® or the like. Note that the communication unit 101 may be configured to include a function of searching for the hearable device 200 residing in the room of the vehicle 10 by transmitting a polling signal using radio waves in a low frequency (hereinafter, called LF) band. Here, in a case where the vehicle 10 is equipped with multiple seats, the hearable device 200 may be searched for on a seat-by-seat basis by transmitting the polling signal with respect to each seat.

The controller 102 includes a processor, such as a CPU, and performs control of the vehicle-mounted device 100. The controller 102 in this example includes function modules that are a detection unit 1021, an obtaining unit 1022, a generation unit 1023 and the like. These function modules are achieved by the processor executing the program stored in the storage 103.

The detection unit 1021 detects the user in the vehicle 10 in a state of wearing the hearable device 200 (hereinafter, sometimes described as "target user"). For example, the detection unit 1021 may detect the target user by analyzing an image taken by the camera 104 described later. According to another method, the detection unit 1021 may search for the hearable device 200 by causing the communication unit 101 to transmit the polling signal, and estimate that the target user is in the vehicle 10 according to detection of the hearable device 200. When the target user is detected by any of the various methods described above, information about the seat position of the target user is passed from the detection unit 1021 to the obtaining unit 1022. The seat position of the target user is identified by analyzing an image taken by the camera 104. Note that according to the method of detecting the target user using the polling signal, the seat position of the target user may be identified on the basis of presence or absence of a response to each polling signal transmitted on a seat-by-seat basis.

The detection process for the target user by the detection unit 1021 as described above is executed repeatedly at a predetermined period in a state where the vehicle 10 has been activated (a state where an ignition switch, a power switch or the like is turned on).

The obtaining unit 1022 obtains the operation mode of the vehicle 10 at the current time by communicating with the control device VCU via the communication unit 101. The obtaining process for the drive mode by the obtaining unit 1022 is performed by a trigger that is detection of the target user by the detection unit 1021. There is a possibility that the drive mode of the vehicle 10 is switched by the user at any timing. Accordingly, even when such switching is performed, the obtaining process for the drive mode by the obtaining unit 1022 may be executed. That is, when the drive mode switching by the user is performed, the drive mode may be notified from the control device VCU to the vehicle-mounted device 100 every time of switching. In such a case, the detection process by the detection unit 1021 may be performed by a trigger that is obtainment of the drive mode by the obtaining unit 1022. The information about the drive mode obtained by the obtaining unit 1022 is passed together with information received from the detection unit 1021, to the generation unit 1023.

The generation unit 1023 generates a mode setting command on the basis of the information received from the obtaining unit 1022. Specifically, first, the generation unit 1023 determines whether the drive mode obtained by the obtaining unit 1022 is the automatic drive mode or the manual drive mode. When the drive mode obtained by the obtaining unit 1022 is the manual drive mode, the generation unit 1023 determines whether the seat position of the target user is the driver's seat. At this time, when the seat position of the target user is the driver's seat, the target user is determined to be a user performing the drive operation of the vehicle 10. Accordingly, the generation unit 1023 generates a command (mode setting command) for setting the operation mode of the hearable device 200 worn by the target user to the second mode. The generation unit 1023 then transmits the generated mode setting command to the hearable device 200 via the communication unit 101.

When multiple target users are in the vehicle 10, the generation unit 1023 determines whether the target users include a target user seated in the driver's seat. When the multiple target users include the target user seated in the driver's seat, the generation unit 1023 generates the mode setting command in a manner similar to that described above. The generation unit 1023 then transmits the generated mode setting command to the hearable device 200 of the target user seated in the driver's seat via the communication unit 101.

Note that when the drive system of the vehicle 10 is stopped (for example, the ignition switch, the power switch or the like is turned off) after the process of transmitting the mode setting command is performed, the generation unit 1023 may transmit a permission signal to the hearable device 200. The "permission signal" described here is a signal for permitting the target user to switch the operation mode.

In any of a case where the drive mode obtained by the obtaining unit 1022 is the automatic drive mode, a case where the drive mode obtained by the obtaining unit 1022 is the manual drive mode and the seat position of the target user is other than the driver's seat, and a case where the drive mode obtained by the obtaining unit 1022 is the manual drive mode and the multiple target users include no target user seated in the driver's seat, the generation unit 1023 does not generate the mode setting command described above. Accordingly, no mode setting command is transmitted to the hearable devices 200 of the target users.

The storage 103 stores various types of information. The storage 103 includes a storage medium, such as a RAM, a magnetic disk, or a flash memory. The storage 103 stores various programs to be executed by the processor, various data items and the like.

The camera 104 takes an image of the inside of the room of the vehicle 10. A dashboard camera (dashcam) already provided for the vehicle 10 or the like may be used, or a dedicated camera may be used, as such a camera 104.

A series of processes executed by the vehicle-mounted device 100 configured as described above can be executed by hardware, or can be executed by software.

(Hearable Device 200)

Next, the hearable device 200 is described. The hearable device 200 is a wearable computer that the user can wear, and is worn on the ears of the user as illustrated in FIG. 2 having already been referred to.

As illustrated in FIG. 3, the hearable device 200 in this example includes a communication unit 201, a controller 202, sound emitters 203, a sound collector 204, and a switch unit 205. The configuration of the hearable device 200 is not limited to the example illustrated in FIG. 3. Configuration elements may be appropriately omitted, replaced, and added.

The communication unit 201 is a wireless communication interface for connecting the hearable device 200 to a network. The communication unit 201 is connected to the network using, for example, a mobile communication service, such as of 5G or LTE, or a wireless communication network, such as of Wi-Fi®, and communicates with an external device via the network. The "external device" described here is a device for providing the hearable device 200 with audio content that the user wishes, via the network. Note that the audio content provided from the external device is, for example, music data, machine-translated audio data, or audio data indicating a result of information search using the Internet or the like.

The communication unit 201 in this example also includes a function of communicating with the vehicle-mounted device 100 using a wireless communication standard similar to that of the communication unit 101 of the vehicle-mounted device 100. Furthermore, the communication unit 201 may be configured to include a function of responding to a polling signal from the vehicle-mounted device 100, using radio waves in a radio frequency (hereinafter, called RF) band, upon receipt of the polling signal. A response signal at this time may include information for identifying the hearable device 200.

For example, the controller 202 may be made up of a microcomputer, and performs control of the hearable device 200. For example, the controller 202 controls the aftermentioned sound emitters 203 and sound collector 204, according to the operation mode of the hearable device 200.

When the operation mode of the hearable device 200 is herein set to the first mode, the controller 202 causes the sound collector 204 to collect an external sound, and generates a sound including a phase opposite to that of the collected sound (hereinafter, sometimes described as "cancellation sound"). The controller 202 then causes the sound emitters 203 to emit audio content that the user wishes, while causing the sound emitter 203 to emit the generated cancellation sound described above. This can make the user difficult to hear the external sound. As a result, the user can more easily hear the sound of the audio content.

When the operation mode of the hearable device 200 is set to the second mode, the controller 202 causes the sound emitters 203 to emit the external sound collected by the sound collector 204, and the audio content. This can make the user easy to hear the external sound. As a result, although there is a possibility that it is difficult for the user to hear the sound of the audio content, the user is allowed to hear the external sound.

The method of achieving the first mode and the second mode is not limited to the method described above. Another known method can be used. For example, a method may be used that reduces the external sound using a filter circuit in the first mode, and disables the filter circuit in the second mode.

Switching between the first mode and the second mode is performed by the user operating the switch unit 205 described later. However, when the communication unit 201 receives the mode setting command described above, the controller 202 sets the operation mode of the hearable device 200 to the second mode irrespective of the operation of the switch unit 205 by the user. Accordingly, in a case where the user wearing the hearable device 200 corresponds to the target user described above and is a user performing the drive operation of the vehicle 10, the operation mode of the hearable device 200 is automatically set to the second mode. The controller 202 then restricts the operation mode from being switched by the operation of the user until the permission signal described above is received from the vehicle-mounted device 100. Consequently, in a time period from reception of the mode setting command by the communication unit 201 to reception of the permission signal, the operation mode of the hearable device 200 is left set to the second mode.

The sound emitters 203 include a first sound emitter 203R provided in the first sound emission unit 200R, and a second sound emitter 203L provided in the second sound emission unit 200L. Audio emitted from each of the first sound emitter 203R and the second sound emitter 203L is determined according to the attribute of audio content (e.g., a stereo sound source, a monaural sound source or the like).

The sound collector 204 collects an external sound (a sound around the hearable device 200). Typically, the sound collector 204 is made up of a microphone or the like. As described above, the external sound collected by the sound collector 204 is used for generating the cancellation sound, or sound emission from the sound emitters 203.

The switch unit 205 is a device for switching the operation mode of the hearable device 200. The switch unit 205 includes, for example, a button, a touch sensor or the like provided on the first sound emission unit 200R and/or the second sound emission unit 200L. When such a button or touch sensor is operated by the user, its operation signal is notified from the switch unit 205 to the controller 202, thereby switching the operation mode by the controller 202.

(Processing Flow)

Figure 4:
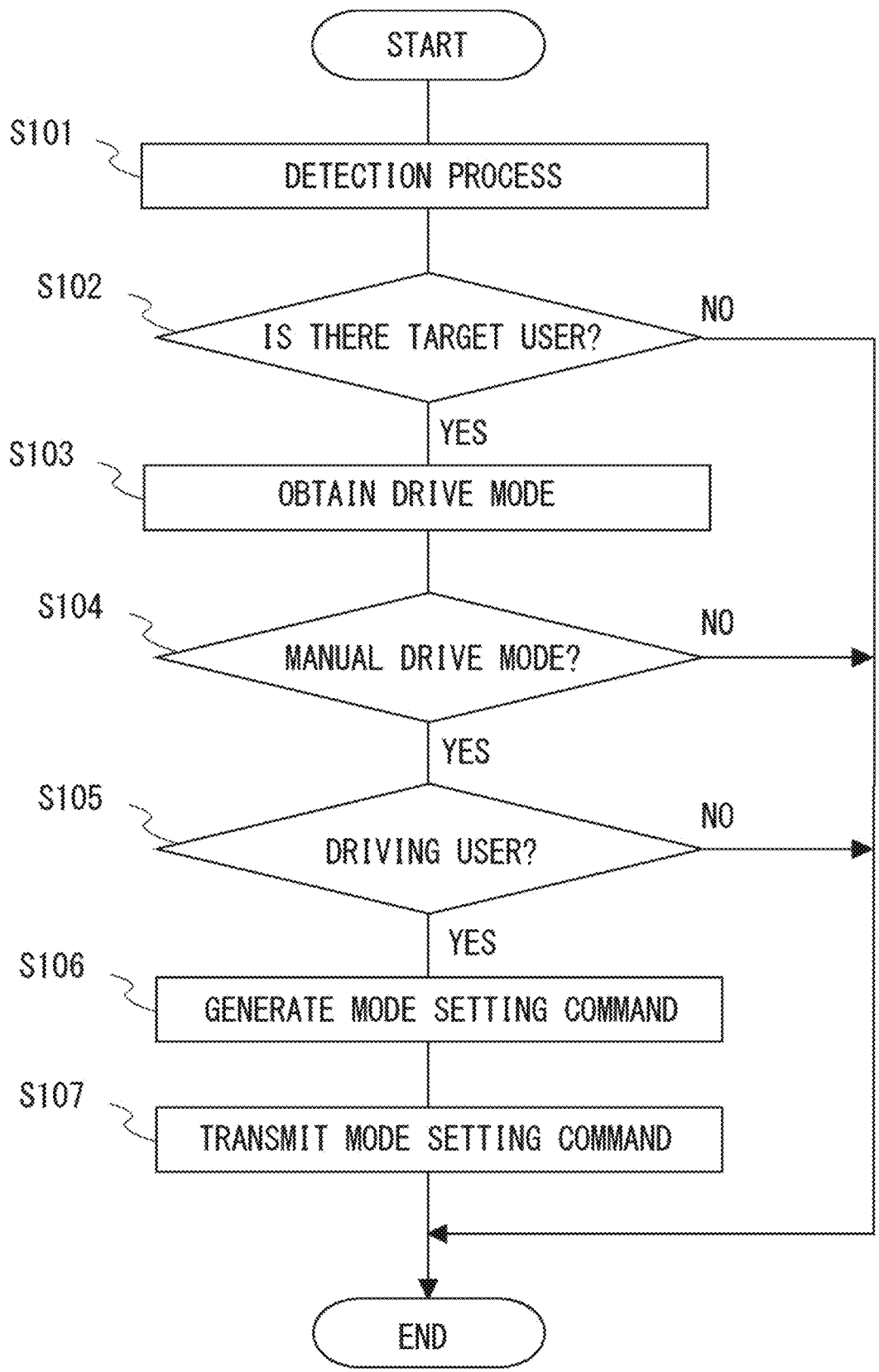
FIG. 4 is a flowchart illustrating a processing flow performed in the vehicle-mounted device in an embodiment.

Next, the flow of processes executed in the vehicle-mounted device 100 in this embodiment is described with reference to FIG. 4. FIG. 4 is a flowchart illustrating a processing flow executed repeatedly at a predetermined period in the vehicle-mounted device 100 in a state where the vehicle 10 is activated.

In the processing flow in FIG. 4, the detection unit 1021 of the vehicle-mounted device 100 executes a process (detection process) for detecting the target user (step S101). Specifically, the detection unit 1021 analyzes an image of the inside of the room taken by the camera 104, thereby detecting presence or absence of the user (target user) being in the vehicle in a state of the user wearing the hearable device 200. As described above, the detection unit 1021 may search for presence or absence of the hearable device 200 residing in the room by causing the communication unit 101 to transmit the polling signal for each seat.

Here, when the target user is not detected by the image analysis described above, or when the hearable device 200 is not detected by the search using the polling signal described above, it is determined that no target user is in the vehicle 10 (a negative determination in step S102). In this case, execution of this processing flow is once finished. On the contrary, when the target user is detected by the image analysis described above, or when the hearable device 200 is detected by the search using the polling signal described above, it is determined that the target user is in the vehicle 10 (an affirmative determination in step S102). In this case, information about the seat position of the target user is passed from the detection unit 1021 to the obtaining unit 1022. The seat position of the target user may be identified by analyzing an image taken by the camera 104. The seat position of the target user may be identified on the basis of presence or absence of a response to each polling signal transmitted on a seat-by-seat basis.

The obtaining unit 1022 obtains the drive mode of the vehicle 10 at the current time by communicating with the control device VCU via the communication unit 101 (step S103). The information about the drive mode obtained by the obtaining unit 1022 is passed together with information passed from the detection unit 1021 to the obtaining unit 1022, to the generation unit 1023.

The generation unit 1023 determines whether the drive mode obtained by the obtaining unit 1022 is the manual drive mode (step S104). At this time, when the drive mode obtained by the obtaining unit 1022 is the automatic drive mode (a negative determination in step S104), execution of this processing flow is once finished. At this time, when the process of transmitting the mode setting command to the hearable device 200 has already been performed in a time period from activation of the vehicle 10 to the current time, the generation unit 1023 may transmit the permission signal described above to the hearable device 200 through the communication unit 101. Accordingly, when the drive mode of the vehicle 10 is switched from the manual drive mode to the automatic drive mode, the operation mode of the hearable device 200 is permitted to be switched by the target user from the second mode to the first mode. As a result, even if the seat position of the target user is the driver's seat when the drive mode of the vehicle 10 is the automatic drive mode, the target user can hear the audio content without feeling pesky about the external sound. On the other hand, when the drive mode obtained by the obtaining unit 1022 is the manual drive mode (an affirmative determination in step S104), a process of step S105 is executed.

In step S105, the generation unit 1023 determines whether the target user is the user (driving user) performing the drive operation of the vehicle 10. Such determination is performed on the basis of the seat position of the target user identified by the detection unit 1021. That is, the generation unit 1023 determines whether the seat position of the target user is the driver's seat. When the seat position of the target user is other than the driver's seat, the target user is determined not to be the driving user (a negative determination in step S105). In this case, execution of this processing flow is once finished. Accordingly, when the target user is not the driving user even if the drive mode of the vehicle 10 is the manual drive mode, the operation mode of the bearable device 200 is permitted to be set to the first mode by the operation mode of the target user. As a result, the target user can hear the audio content without feeling pesky about the external sound. On the other hand, when the seat position of the target user is the driver's seat, the target user is determined to be the driving user (an affirmative determination in step S105). In this case, a process of step S106 is executed.

In step S106, the generation unit 1023 generates the mode setting command. As described above, the mode setting command is a command of setting the operation mode of the hearable device 200 worn by the target user to the second mode. The mode setting command generated by the generation unit 1023 is transmitted to the hearable device 200 of the target user via the communication unit 101 (step S107). In this case, in the hearable device 200 of the target user, the controller 202 sets the operation mode of the hearable device 200 to the second mode. Accordingly, when the drive mode of the vehicle 10 is the manual drive mode and the target user is the driving user, the operation mode of the hearable device 200 is automatically set to the second mode. The controller 202 then restricts the operation mode from being switched by the operation of the user until the permission signal described above is received from the vehicle-mounted device 100. Consequently, in a time period from reception of the mode setting command by the communication unit 201 to reception of the permission signal, the operation mode of the hearable device 200 is continuously set to the second mode irrespective of the operation of the switch unit 205 by the target user. As a result, when the target user performs the drive operation of the vehicle 10, the target user is allowed to hear the external sound.

According to the processing flow in FIG. 4, when the drive mode of the vehicle 10 is the automatic drive mode even if the seat position of the target user is the driver's seat, the operation mode of the hearable device 200 is permitted to be set to the first mode by the operation of the target user. When the seat position of the target user is other than the driver's seat even when the drive mode of the vehicle 10 is the manual drive mode, the operation mode of the hearable device 200 is permitted to be set to the first mode by the operation of the target user. Note that when the drive mode of the vehicle 10 is the manual drive mode and the seat position of the target user is the driver's seat, the operation mode of the hearable device 200 is limited only to the second mode.

Consequently, according to this embodiment, in conformity with the drive mode of the vehicle 10, use of the first mode in the hearable device 200 can be permitted or prevented. As a result, the usability when the user wearing the hearable device 200 boards the vehicle 10 can be improved as much as possible.

MODIFIED EXAMPLE 1

According to the embodiment described above, the example is described where the operation mode of the hearable device 200 is permitted to be set to the first mode by the operation of the target user, in any of a case where the drive mode of the vehicle 10 is the automatic drive mode, and a case where the drive mode of the vehicle 10 is the manual drive mode and the seat position of the target user is other than the driver's seat. Meanwhile, according to this modified example, an example is described where even in such cases, the operation mode of the hearable device 200 is automatically set to the second mode when the predetermined emergency situation occurs.

Here, when an approach by another mobile body (e.g., another vehicle, a pedestrian or the like) to the vehicle 10 is detected, the control device VCU issues an alert to occupants through a speaker or the like mounted on the vehicle 10, in some cases. In such cases, when the occupants include the target user and the hearable device 200 of the target user is set to the first mode, there is a possibility that the target user fails to hear the alert.

In case the vehicle 10 collides with the target object (e.g., another mobile body, a structure or the like) (for example, an airbag system operates), the control device VCU issues an alert to the occupants, or automatically issues an emergency notification, in some cases. In such cases, when the occupants include the target user and the hearable device 200 of the target user is set to the first mode, there is a possibility that the target user fails to hear the alert, or fails to quickly start talking with an operator or the like at the notification destination.

In case an abnormal behavior, such as deviation of the vehicle 10 from the traveling lane, skidding of the vehicle 10, or weaving of the vehicle 10, occurs, the control device VCU issues an alert to the occupants, in some cases. In such cases, when the occupants include the target user and the hearable device 200 of the target user is set to the first mode, there is a possibility that the target user fails to hear the alert.

In case an abnormality occurs at the user performing the drive operation of the vehicle 10 (driving user), the control device VCU issues an alert to users riding together (passenger users) in some cases. In such cases, when the passenger users include the target user and the hearable device 200 of the target user is set to the first mode, there is a possibility that the target user fails to hear the alert.

Consequently, when any of various emergency situations (predetermined emergency situation) as described above is detected, measures for allowing the user wearing the hearable device 200 to recognize occurrence of the emergency situation more securely is required. Accordingly, this modified example is configured such that when the predetermined emergency situation occurs, the hearable device 200 is automatically set to the second mode and the sound of an alert is emitted from the hearable device 200. Note that the predetermined emergency situation is not limited to any of the situations exemplified above, and may be a situation of occurrence of a possibility that a disaster occurs on the track of the vehicle 10 or shortly occurs.

(Processing Flow)

Here, the flow of processes executed in the vehicle-mounted device 100 in this modified example is described with reference to FIG. 5. FIG. 5 is a flowchart illustrating the flow of interrupt processes executed by the vehicle-mounted device 100 triggered by detection of the predetermined emergency situation by the control device VCU.

In the processing flow in FIG. 5, when the controller of the vehicle 10 detects the predetermined emergency situation, information about the predetermined emergency situation (emergency information) is transmitted from the controller of the vehicle 10 to the vehicle-mounted device 100.

When such emergency information is received by the communication unit 101 of the vehicle-mounted device 100 (step S201), the emergency information is passed from the communication unit 101 to the generation unit 1023.

The generation unit 1023 generates an alert on the basis of the emergency information (step S202). For example, when the emergency information is information indicating approach of another mobile body to the vehicle 10, audio data for notifying the target user of the approach of the other mobile body is generated as an alert. When the emergency information is information indicating collision between the vehicle 10 and the target object, audio data for notifying the target user of the collision of the vehicle 10 is generated as an alert. Here, when the emergency notification is issued by the control device VCU, a voice call with an operator at the notification destination may be included in the alert. When the emergency information is information indicating an abnormal behavior of the vehicle 10, audio data for notifying the target user of the occurrence of the abnormal behavior in the vehicle 10 is generated as an alert. When the emergency information is information indicating abnormality of the driving user, audio data for notifying the target user of the occurrence of the abnormality at the driving user is generated as an alert.

The generation unit 1023 generates a warning command (step S203). As illustrated in FIG. 6, the "warning command" described here may include a second mode setting command, an alert output command, and alert audio data. Similar to the mode setting command in the embodiment described above, the second mode setting command is a command for setting the operation mode of the hearable device 200 to the second mode. The alert output command is a command for causing the sound emitters 203 of the hearable device 200 to emit audio data on the alert generated in step S202. Note that the alert output command may include information (designation information) designating sound emission of the alert audio data from only any sound emitter between the first sound emitter 203R and the second sound emitter 203L. For example, in the situation where the other mobile body approaches the right of the vehicle 10, the sound emitter positioned on the right side in the lateral direction of the vehicle 10 between the first sound emitter 203R and the second sound emitter 203L may be designated. At this time, when the target user boards and is oriented in the traveling direction of the vehicle 10, the first sound emitter 203R serves as the target of this designation. On the other hand, when the target user boards and is oriented in the direction opposite to the traveling direction of the vehicle 10, the second sound emitter 203L serves as the target of this designation. In the situation where the other mobile body approaches the left of the vehicle 10, the sound emitter positioned on the left side in the lateral direction of the vehicle 10 between the first sound emitter 203R and the second sound emitter 203L may be designated. At this time, when the target user boards and is oriented in the traveling direction of the vehicle 10, the second sound emitter 203L serves as the target of this designation. On the other hand, when the target user boards and is oriented in the direction opposite to the traveling direction of the vehicle 10, the first sound emitter 203R serves as the target of this designation. When the sound of the alert audio data is emitted according to such designation information, the target user can intuitively grasp a direction in which the other mobile body approaches. Note that the direction of the target user may be identified on the basis of the seat position of the target user.

As described above, the warning command generated by the generation unit 1023 is transmitted to the hearable device 200 of the target user via the communication unit 101 (step S204). In this case, the hearable device serving as the transmission destination of the warning command is not limited to the hearable device of the target user performing the drive operation of the vehicle 10, and may be the hearable device of the target user performing no drive operation of the vehicle 10. That is, when multiple target users are in the vehicle 10, the warning command is transmitted to the hearable devices 200 of all the target users. In the hearable device 200 having received the warning command, the controller 202 sets the operation mode of the hearable device 200 to the second mode and causes the sound emitters 203 to emit the alert audio data.

According to the processing flow in FIG. 5, in case the predetermined emergency situation occurs, the hearable device of the target user is set to the second mode and the alert audio data is emitted from the hearable device 200, irrespective of whether the target user is the driving user or not. Accordingly, even in case a speaker or the like mounted on the vehicle 10 malfunctions owing to occurrence of the predetermined emergency situation, the alert audio data can be more securely transmitted to the user. As a result, the target user can more quickly recognize occurrence of the predetermined emergency situation.

Note that not only in the case where the predetermined emergency situation occurs, but also in the case where multiple users are in the vehicle 10 and any of the users speaks, the operation mode of the hearable device 200 may be automatically set to the second mode. Accordingly, even in the case where the target user sets the operation mode of the hearable device 200 to the first mode, the target user can hear the speech of the other user. Note that the speech of the user in the vehicle 10 may be detected by providing a microphone or the like in the vehicle.

MODIFIED EXAMPLE 2

In the aforementioned embodiment and modified example 1, the examples are described where the information processing device according to the present disclosure is applied to the vehicle 10 switchable between the automatic drive mode and the manual drive mode. The information processing device according to the present disclosure may be applied also to a vehicle that can travel only in the automatic drive mode, or a vehicle that can travel only in the manual drive mode.

In the case where the information processing device according to the present disclosure is applied to the vehicle that can travel only in the automatic drive mode, the process of obtaining the drive mode of the vehicle is omitted. It is only required to permit the first mode to be set for the hearable devices of all the target users in the vehicle. Similar to the modified example 1 described above, in case the predetermined emergency situation occurs, the hearable devices of all the target users are set to the second mode, and the sound of the alert audio data is allowed to be emitted from the hearable devices.

Also in the case where the information processing device according to the present disclosure is applied to the vehicle that can travel only in the manual drive mode, the process of obtaining the drive mode of the vehicle is omitted. Only the hearable device of the target user seated in the driver's seat of the vehicle may be automatically set to the second mode, and the target users seated in seats other than the driver's seat may be permitted to set the first mode. Similar to the modified example 1 described above, in case the emergency situation occurs, the hearable devices of all the target users are set to the second mode, and the sound of the alert audio data is allowed to be emitted from the hearable devices.

Other

The embodiment and modified examples described above are only examples. The present disclosure can be implemented while being appropriately changed in a range without departing from the gist. For example, the embodiment and the modified examples described above may be combined as much as possible and implemented.

The processes and means described in the present disclosure can be freely combined and implemented only when no technical contradiction occurs. Furthermore, the process described as what is performed by a single device may be divided up among devices and executed. Alternatively, processes described by different devices may be executed by a single device. For example, the process described to be executed by the vehicle-mounted device 100 may be performed by the control device VCU, or performed by the bearable device 200. In the computer system, the hardware configuration achieving each function can be flexibly changed.

The present disclosure can be achieved also by supplying a computer with a computer program implementing the functions described in the aforementioned embodiment, and by one or more processors included in the computer reading and executing the program. Such a computer program may be provided for the computer through a non-transitory computer-readable storage medium connectable to a system bus of the computer, or for the computer via the network. The non-transitory computer-readable storage medium is a recording medium that can accumulate information, such as data and programs, through electric, magnetic, optical, mechanical or chemical actions, and allow the information to be read from the computer or the like. Such a recording medium may be exemplified as any type of disk, such as a magnetic disk (Floppy® disk, a hard disk drive (HDD), etc.), or an optical disk (a CD-ROM, a DVD disk, a Blu-ray disc, etc.). The recording medium may be a medium, such as a read only memory (ROM), a random access memory (RAM), an EPROM, an EEPROM, a magnetic card, a flash memory, an optical card, an SSD (Solid State Drive), etc.

What is claimed is:

1. An information processing device for controlling a hearable device switchable between a first mode that is an operation mode of making an external sound difficult to hear, and a second mode that is an operation mode of making the external sound easy to hear, the information processing device comprising a controller including at least one processor configured to execute:
    obtaining a drive mode of a vehicle in which a user wearing the hearable device rides;
    permitting the operation mode of the hearable device to be set to the first mode, when the drive mode of the vehicle is an automatic drive mode;
    setting the operation mode of the hearable device to the second mode when the user is a user performing a drive operation of the vehicle and the drive mode of the vehicle is a manual drive mode;
    receiving a permission signal for permitting the user to switch the operation mode after setting the operation mode of the hearable device to the second mode, the permission signal being transmitted in a case where an ignition switch or a power switch included in the vehicle is turned off; and
    permitting the user to switch the operation mode from the second mode to the first mode in response to receiving the permission signal.

2. The information processing device according to claim 1,
    wherein the controller permits the operation mode of the hearable device to be set to the first mode when the user is a user not performing the drive operation of the vehicle and the drive mode of the vehicle is the manual drive mode.

3. The information processing device according to claim 1,
    wherein when a predetermined emergency situation is detected, the controller sets the operation mode of the hearable device to the second mode.

4. The information processing device according to claim 3,
    wherein when the predetermined emergency situation is detected, the controller causes the hearable device to emit a sound of an alert.

5. The information processing device according to claim 4,
    wherein the predetermined emergency situation is a situation where another mobile body approaches the vehicle.

6. The information processing device according to claim 5,
    wherein the hearable device includes a pair of sound emitters configured to emit sounds to respective ears of the user, the pair of sound emitters including a first sound emitter worn on a right ear of the user and a second sound emitter worn on a left ear of the user,
    when a situation where the other mobile body approaches a right side of the vehicle is detected, the controller causes the first sound emitter to emit the sound of the alert, and
    when a situation where the other mobile body approaches a left side of the vehicle is detected, the controller causes the second sound emitter to emit the sound of the alert.

7. The information processing device according to claim 4,
    wherein the predetermined emergency situation is a situation where a notification device mounted on the vehicle issues an emergency notification, and the alert includes a call with a notification destination of the emergency notification.

8. The information processing device according to claim 3,
    wherein the predetermined emergency situation is a situation where the vehicle collides with a target object.

9. The information processing device according to claim 3,
    wherein the predetermined emergency situation is a situation where the vehicle causes an abnormal behavior.

10. The information processing device according to claim 3, wherein the predetermined emergency situation is a situation where a notification device mounted on the vehicle issues an emergency notification.

11. The information processing device according to claim 3,
    wherein the predetermined emergency situation is a situation where an abnormality occurs with the user performing the drive operation of the vehicle.

12. The information processing device according to claim 1,
wherein when a second user in the vehicle speaks and a third user is also in the vehicle, the controller sets the operation mode of a second hearable device worn by the third user to the second mode.

13. An information processing method for controlling a hearable device switchable between a first mode that is an operation mode of making an external sound difficult to hear, and a second mode that is an operation mode of making the external sound easy to hear, the information processing method comprising:
obtaining a drive mode of a vehicle in which a user wearing the hearable device rides;
permitting the operation mode of the hearable device to be set to the first mode, when the drive mode of the vehicle is an automatic drive mode;
setting the operation mode of the hearable device to the second mode when the user is a user performing a drive operation of the vehicle and the drive mode of the vehicle is a manual drive mode;
receiving a permission signal for permitting the user to switch the operation mode after setting the operation mode of the hearable device to the second mode, the permission signal being transmitted in a case where an ignition switch or a power switch included in the vehicle is turned off; and
permitting the user to switch the operation mode from the second mode to the first mode in response to receiving the permission signal.

14. The information processing method according to claim 13, further comprising:
permitting the operation mode of the hearable device to be set to the first mode when the user is a user not performing the drive operation of the vehicle and the drive mode of the vehicle is the manual drive mode.

15. The information processing method according to claim 13, further comprising:
setting the operation mode of the hearable device to the second mode, when a predetermined emergency situation is detected.

16. The information processing method according to claim 15, further comprising:
causing the hearable device to emit a sound of an alert, when the predetermined emergency situation is detected.

17. The information processing method according to claim 16,
wherein the predetermined emergency situation is a situation where another mobile body approaches the vehicle.

18. The information processing method according to claim 17,
wherein the hearable device includes a pair of sound emitters configured to emit sounds to respective ears of the user, the pair of sound emitters including a first sound emitter worn on a right ear of the user and a second sound emitter worn on a left ear of the user,
when a situation where the other mobile body approaches a right side of the vehicle is detected, causing a sound emitter positioned on the right side in a lateral direction of the vehicle, between the pair of sound emitters, to emit the sound of the alert, and
when a situation where the other mobile body approaches a left side of the vehicle is detected, causing a sound emitter positioned on the left side in the lateral direction of the vehicle, between the pair of sound emitters, to emit the sound of the alert.

19. The information processing method according to claim 15, wherein the predetermined emergency situation is a situation where a notification device mounted on the vehicle issues an emergency notification.

20. A non-transitory storage medium storing a program for causing a computer to execute the information processing method according to claim 13.

* * * * *